(12) United States Patent
Ogawa (10) Patent No.: US 7,236,892 B2
(45) Date of Patent: Jun. 26, 2007

(54) VEHICLE WHEEL STATE MONITORING DEVICE AND METHOD

(75) Inventor: Atsushi Ogawa, Dusseldorf (DE)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/280,180

(22) Filed: Nov. 17, 2005

(65) Prior Publication Data

US 2006/0111853 A1 May 25, 2006

(30) Foreign Application Priority Data

Nov. 25, 2004 (JP) ............................. 2004-341281

(51) Int. Cl.
*B60C 23/00* (2006.01)
*G01M 17/02* (2006.01)

(52) U.S. Cl. ........................................ 702/35; 340/444
(58) Field of Classification Search .................. 702/35; 340/442, 447

See application file for complete search history.

(56) References Cited

U.S. PATENT DOCUMENTS 2,973,430 A * 2/1961 Pelino ......................... 246/249
5,573,610 A * 11/1996 Koch et al. ............... 152/152.1
6,591,668 B1 * 7/2003 Becherer et al. ............... 73/146
6,946,954 B2 * 9/2005 Piech et al. .................. 340/444
6,960,994 B2 * 11/2005 Tabata et al. ................ 340/442
7,116,218 B2 * 10/2006 Ogawa et al. ............... 340/447
2006/0111853 A1 * 5/2006 Ogawa ........................ 702/35

FOREIGN PATENT DOCUMENTS

| JP | A 9-169203 | 6/1997 |
| JP | A 2000-318416 | 11/2000 |
| JP | A 2004-98877 | 4/2004 |

* cited by examiner

Primary Examiner—Michael Nghiem
Assistant Examiner—Victor J. Taylor
(74) Attorney, Agent, or Firm—Oliff & Berridge PLC

(57) ABSTRACT

A vehicle wheel state monitoring device appropriately determines whether it is probable that a vehicle wheel is damaged by setting a threshold value for damage determination in accordance with a type of the vehicle wheel fitted to the vehicle. A road surface input calculation portion calculates a road surface input that is a load applied to the tire based on an up-down direction force transmitted to the tire from a road surface. A damage determination portion determines whether it is probable that the vehicle wheel is damaged by comparing the road surface input and a threshold value that is pre-set. A vehicle wheel distinguishing portion receives information from a recording device provided on the vehicle wheel, and distinguishes the type of vehicle wheel fitted to the vehicle wheel. A threshold setting portion sets a threshold value in accordance with the distinguished type of the vehicle wheel.

9 Claims, 6 Drawing Sheets

VEHICLE WHEEL STATE MONITORING DEVICE AND METHOD

INCORPORATION BY REFERENCE

The disclosure of Japanese Patent Application No. 2004-341281 filed on Nov. 25, 2005, including the specification, drawings and abstract is incorporated herein by reference in its entirety.

BACKGROUND OF THE INVENTION

1. Field of the Invention

The invention relates to a vehicle wheel state monitoring device and method, and more particularly to a technology that monitors whether it is probable that a vehicle wheel is damaged during running of a vehicle.

2. Description of the Related Art

In order to run a vehicle safely it is essential to maintain the vehicle wheels, which include both tires and wheels, in a normal state. Accordingly, if an abnormality of the vehicle wheels occurs, such as when the air pressure of the tires is inadequate or the tires or wheels are damaged, it is important to rapidly detect the abnormality and inform the driver and/or passengers so that appropriate measures can be taken. Various technologies have been disclosed that detect the occurrence of abnormalities of vehicle wheels by monitoring the state of the vehicle wheels.

A vehicle is not always fitted with the same type of vehicle wheel, and thus it is necessary to change a detection method used for detecting the occurrence of abnormalities depending on the type of vehicle wheel being used. For example, Japanese Patent Publication No. JP 2000-318416 A discloses a technology that distinguishes a type of vehicle wheel based on a relationship between a tire air pressure and a spring constant of a spring under the vehicle body, and then detects a vehicle running characteristic for each specified type of vehicle wheel. Moreover, Japanese Patent Publication No. JP 2004-98877 A discloses a tire air pressure reduction warning method in which a threshold value is used for determining whether an internal pressure of a tire has reduced. The threshold value is set in accordance with the type of vehicle wheel fitted to the vehicle.

However, the above described technologies do not disclose any method for handling a situation when different types of run-flat tire wheels are fitted to the vehicle, such as run-flat tire wheels with reinforced sides or with an inner support ring. Accordingly, in such situations, accurate abnormality detection may be impossible.

SUMMARY OF THE INVENTION

It is an object of the invention to provide a technology that can detect damage of a vehicle wheel caused by excessive input of load from a road surface in accordance with a type of vehicle wheel fitted to the vehicle.

A first aspect of the invention is related to a vehicle wheel state monitoring device. This vehicle wheel state monitoring device includes: a detector which is provided on a vehicle wheel and which detects an up-down direction force transmitted from a road surface to a tire of the vehicle wheel, a calculation unit that calculates a road surface input that is a load applied to the tire using the detected up-down direction force, a recording device which is provided on the vehicle wheel and which pre-records information related to the vehicle wheel, a vehicle wheel distinguishing unit that distinguishes a type of the vehicle wheel based on the information which is received from the recording device, a setting unit that sets a first threshold value in accordance with the distinguished type of the vehicle wheel, and a determination unit that determines whether it is probable that the vehicle wheel is damaged by comparing the road surface input and the set first threshold value.

Here, the term "road surface input" indicates a force that is equal to the force applied to the tire from the road surface minus the force absorbed by the suspension. In other words, the road surface input is the actual load applied to the tire. According to this vehicle wheel state monitoring device, the threshold value is set in accordance with the type of the vehicle wheel, and as a result it is possible to appropriately determine whether damage has probably occurred in accordance with the type of the vehicle wheel. Note that, the phrase "the type of vehicle wheel" indicates various types of vehicle wheel including, in addition to normal tire wheels, run-flat tire wheels with an inner support ring, run-flat tire wheels with reinforced sides, spare tire wheels, etc.

A second aspect of the invention relates to a vehicle wheel state monitoring method. This method includes the steps of: detecting an up-down direction force transmitted from a road surface to a tire of a vehicle wheel; calculating a road surface input that is a load applied to the tire using the detected up-down direction force; receiving information from a recording device that pre-records information related to the vehicle wheel, the recording device being provided on the vehicle wheel; distinguishing a type of the vehicle based on the received information; setting a threshold value in accordance with the distinguished type of the vehicle wheel: and determining whether it is probable that the vehicle wheel is damaged by comparing the road surface input and the set threshold value.

According to this method, the threshold value is set in accordance with the type of the vehicle wheel. Thus, it is possible to appropriately determine whether damage has probably occurred in accordance with the type of the vehicle wheel.

According to the vehicle wheel state monitoring device and method of the invention, the threshold value is set in accordance with the type of the vehicle wheel. Accordingly, it is possible to appropriately determine whether damage has probably occurred in accordance with the type of the vehicle wheel.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

A first embodiment of the invention is a vehicle wheel state monitoring device for detecting whether it is probable that a vehicle wheel is damaged as a result of excessive input of load to the vehicle wheel during running of a vehicle. Hereinafter, embodiments of the invention will be described.

First Embodiment

Figure 1:
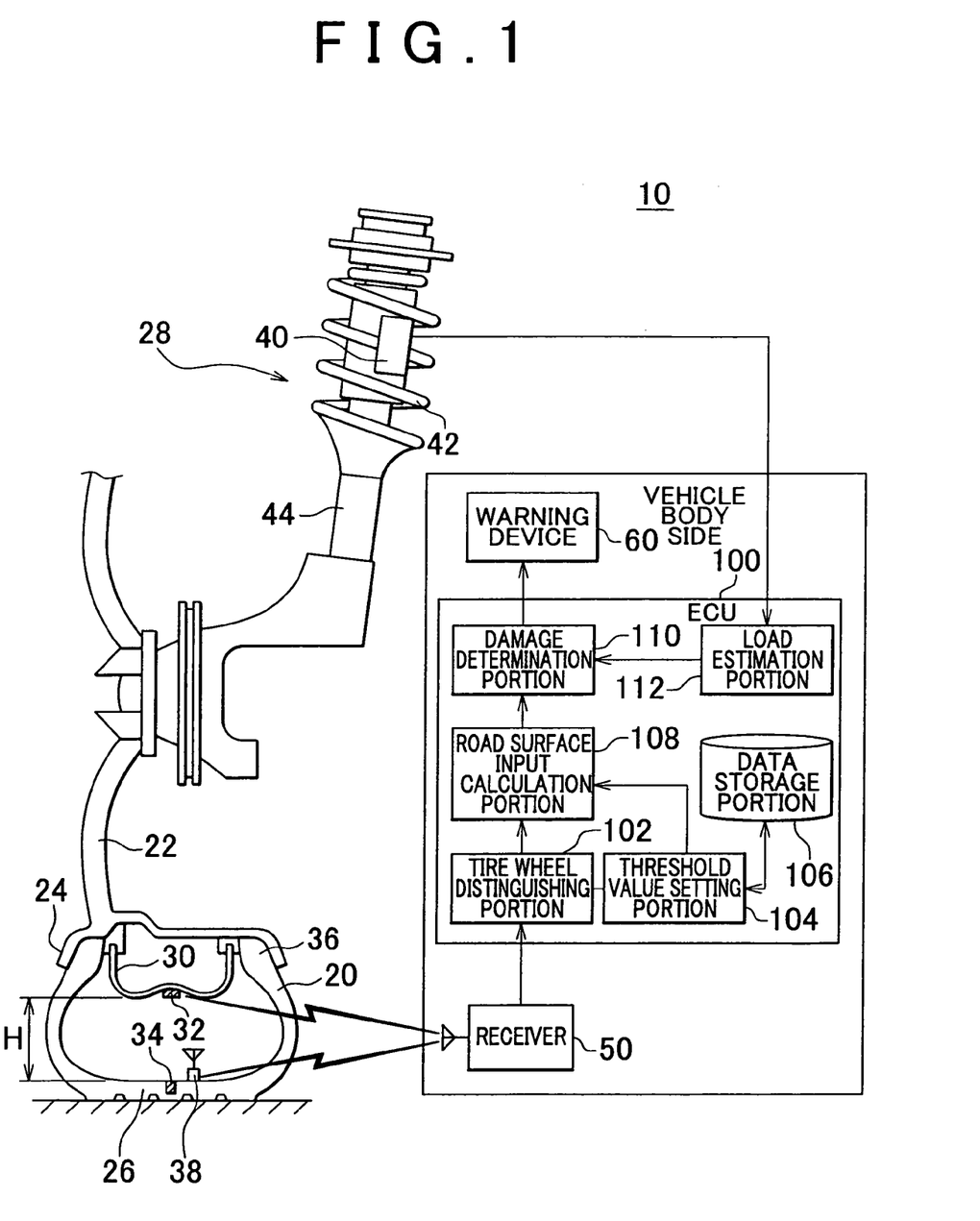
FIG. 1 shows a configuration of a vehicle wheel state monitoring device.

A structure of a vehicle wheel state monitoring device 10 according to the first embodiment will now be explained with reference to FIG. 1. FIG. 1 shows a part of a vehicle wheel such as a run-flat tire wheel with an inner support ring. Beads 36 of a tire 20 are fitted to a wheel rim 24 of a wheel 22. The tire 20 is fixed to the wheel 22 by filling air into the tire 20. A tread 26 of the tire 20 is the section that contacts with the ground and receives load of the vehicle. The wheel 22 is connected to a vehicle body, not shown, via a suspension 28. The suspension 28 mainly includes a coil spring 42 and a shock absorber 44. Note that structural members supported by a spring of the suspension 28 will be referred to as an "above spring portion", and structural members not supported by the spring will be referred to as a "below spring portion". More specifically, the above spring portion is on the side of the vehicle body, and the below spring portion is on the side of the vehicle wheel. A coil spring 42 of the suspension 28 supports a weight of the above spring portion of the vehicle, and acts to absorb transmission of vibrations, shocks, and the like, from a road surface to the vehicle body through the vehicle wheel. The shock absorber 44 reduces up-down vibration of the vehicle body using the coil spring 42.

A stroke sensor 40 for measuring a suspension stroke is provided in the suspension 28. An output (a stroke amount value) of the stroke sensor 40 is transmitted to an electronic control unit (hereinafter referred to as "ECU") 100 that is provided on the vehicle body.

A ring-shaped inner support ring 30 is provided around the entire circumference of the wheel rim 24 at an area of the wheel rim 24 that faces a tire air chamber. The inner support ring 30 is provided to ensure that the vehicle can run for a predetermined distance in the event that the tire 20 becomes flat due to the air in the tire air chamber leaking as a result of damage (hereinafter, running in this state will be referred to as "run-flat running"). More specifically, in the event that the tire 20 becomes flat, an external periphery surface of the inner support ring 30 comes into contact with an internal periphery surface of the tread 26 whereby the inner support ring 30 bears the weight of the vehicle. Accordingly, the inner support ring 30 is made from metal material or resin material which has a certain degree of rigidity and which can bear the weight of the vehicle.

A recording device 32 is provided on the inner support ring 30, and information concerning the vehicle wheel is input thereto. As can be seen from FIG. 1, the external periphery surface of the inner support ring 30 has a slight recess in a central area thereof, and the recording device 32 is disposed in this central area. However, the recording device 32 may be attached to any area of the tire 20 or the wheel 22. The information of the recording device 32 is transmitted to the vehicle body side via a transmitter 38 provided in an air chamber of the tire 20. The recording device 32 is configured from, for example, an IC tag or a semi-conductor chip. Information concerning tire size, inner support ring size, and wheel size, etc. is recorded in the recording device 32.

FIG. 1 shows an inner support ring type run-flat tire wheel. However, as will be described later, the vehicle wheel state monitoring device according to this embodiment can be similarly applied to a normal tire wheel or a run-flat tire wheel with reinforced sides. In this case, the recording device 32 may be disposed, for example, on an external periphery surface of the wheel rim 24.

A sensor 34 for detecting a force in an up-down direction transmitted to the tire 20 from the road surface (hereinafter referred to as "input load") is embedded in a rubber inside portion of the tread 26 of the tire 20. This sensor 34 may be, for example, a deformation gage. In this case, the deformation gage is embedded within the rubber inside portion of the tread 26 so as to be positioned parallel to a direction that is perpendicular with respect to a contact surface of the road surface and the tire 20. A variation amount of the length of the deformation gage is electrically detected. The length variation amount is then used as a basis for deriving the input load of the tire 20. The sensor 34 may alternatively be a piezo-electric device. In this case, the piezo-electric device is embedded within the rubber inside portion of the tread 26 so as to be positioned parallel with the contact surface of the road surface and the tire 20. As a result, the piezo-electic device is able to detect the input load of the tire 20. The piezo-electric device outputs an electric signal in accordance with a pressure applied thereto.

Note that, the sensor 34 may be provided in a plurality in the tire 20. In this case, the sensors 34 are embedded at equal distances apart around the circumferential direction of the tire 20 so as to be able to determine whether it is probable that the vehicle wheel is damaged as a result of excessive input of load from the road. When a plurality of sensors 34 are provided, it is possible to determine whether the vehicle wheel is damage regardless of which area around the periphery of the tire 20 the excessive input of load is applied to. With this configuration, if excessive input of load occurs between the plurality of sensors 34, a maximum value of the input load can be estimated based on detection values of the plurality of sensors 34. Note that, each one of the sensors 34 may be embedded in the vicinity of a center in the width direction of the tread 26 of the tire 20. Further, a plurality of the sensors 34 may be embedded in the width direction of the tire 20. Moreover, separate sensors for detecting input load may be embedded in, for example, a shoulder or a side wall of the tire 20. By adopting configurations like those described above, it is possible to accurately detect localized input load from the road surface.

In the present embodiment, a detection value from the sensor 34 is transmitted to a receiver 50 on the vehicle body side via the transmitter 38. Detection circuits of the sensor 34 and the transmitter 38 are driven by a battery, not shown. Alternatively, the circuits may be configured as a transponder, which periodically receives electric power supply from the vehicle body side. The sensor 34 may then use the electric power to transmit the detection value to the vehicle body side.

The receiver 50 disposed on the vehicle body side receives the detection value of the sensor 34 and vehicle wheel information from the transmitter 38 on the vehicle wheel side, and transmits the received data to an ECU 100.

In FIG. 1, portions of the ECU 100 that are utilized in monitoring the vehicle wheel state are shown in the form of function blocks. Each block shown may be realized (a) using hardware including elements or devices like, for example, a CPU or a memory of a computer, not specifically shown, or (b) using software such as computer programs, etc. However, in this embodiment, the function blocks are realized using a combination of hardware and software. A person skilled in the art will understand that the shown function blocks can be realized in various forms using different combinations of software and hardware.

A vehicle wheel distinguishing portion 102 receives the information recorded in the recording device 32 from the receiver 50, and distinguishes whether the vehicle wheel fitted to the vehicle is a normal tire wheel or a run-flat tire wheel. A threshold value setting portion 104 receives the information about the type of the tyre from the vehicle wheel distinguishing portion 102, and then sets a threshold value for a damage determination portion 110 (described hereinafter) in accordance with the information. A data storage portion 106 pre-stores data such as (i) data for setting the threshold value and (ii) a load-displacement diagram for tire rubber.

A load estimation portion 112 estimates a load applied to the vehicle wheel from the vehicle through the suspension 28. The load estimation portion 112 estimates the load using data that is pre-stored in the data storage portion 106 about the layout and alignment of a suspension system of the vehicle, and the stroke amount value of the suspension 28 obtained from the stroke sensor 40. A road surface input calculation portion 108 calculates an up-down input corresponding to the detection value of the sensor 34. The damage determination portion 110 then compares the up-down input calculated by the road surface input calculation portion 108 and the estimated value calculated by the load estimation portion 112, and determines whether the wheel 22 or the inner support ring 30 is probably damaged. If it is determined that damage has probably occurred, a warning device 60 is caused to generate a warning. As a result, the driver and/or passengers is urged to inspect the vehicle wheel, and notified that there is a chance that run-flat running may not be possible. The warning device 60 may, for example, be a device that issues a warning to the driver and/or passengers by generating sound using a speaker. Alternatively, the warning device 60 may be a display device that displays a warning message on a monitor provided in a passenger compartment, or a transmitter that generates an information signal and transmits it to an inspection system located outside of the vehicle.

The above described sequence of processes of the ECU 100 may be performed for each vehicle wheel fitted to the vehicle. However, if run-flat tire wheels are only used for one or some of the vehicle wheels, the processing may be performed with respect to just the applicable wheels.

Next, run-flat tire wheels will be briefly described. Run-flat tire wheels are a type of vehicle wheel that can support vehicle weight and maintain running for a predetermined distance at a certain speed even if the tire has been damaged and the air pressure within the air chamber is insufficient. Generally speaking, run-flat tire wheels are classified into two types, namely, reinforced side run-flat tire wheels, and inner support ring run-flat tire wheels. As can be seen from FIG. 1, inner support ring run flat tire wheels support vehicle weight using a rigid inner support ring. Reinforced side run flat tire wheels are designed to receive the weight of the vehicle weight on the tire side walls. According, the side walls are reinforced with stiff rubber to provide a structure that makes it difficult for the tire beads to separate from the wheel.

Figure 2:
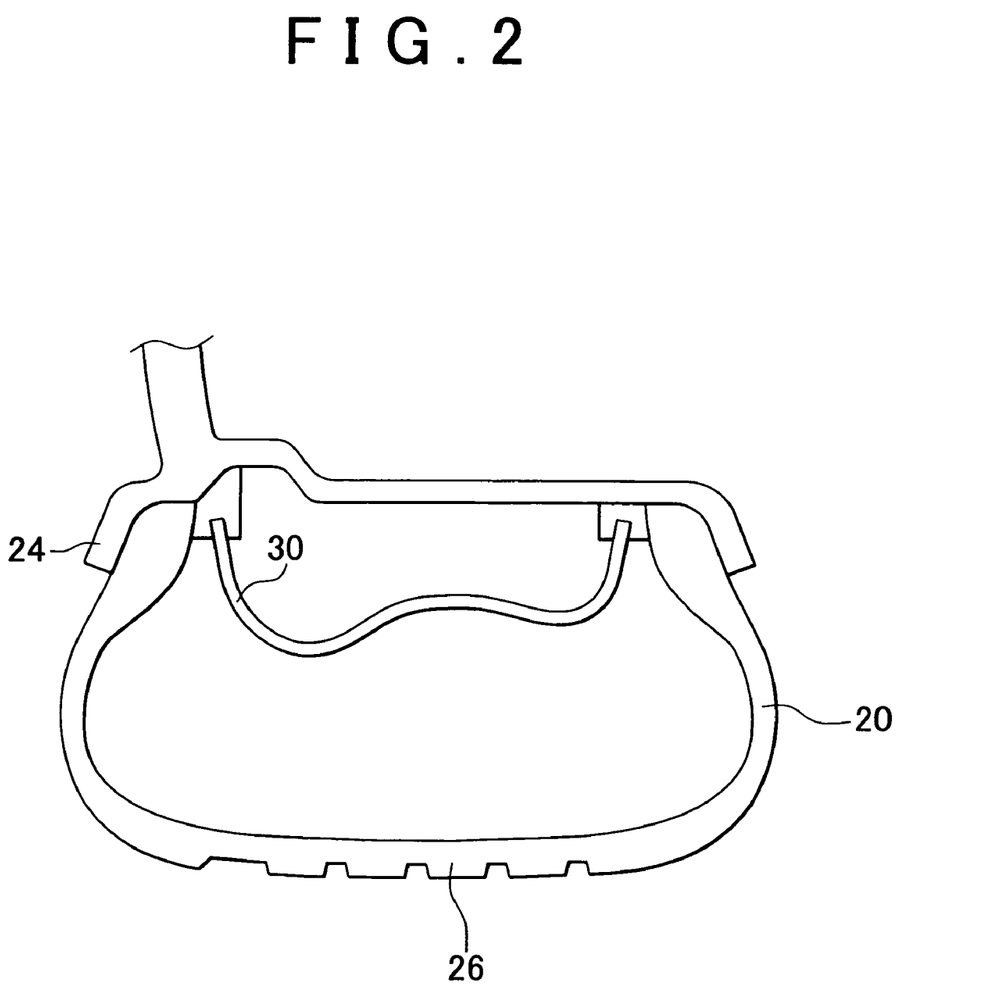
FIG. 2 illustrates an inner support ring run-flat tire wheel that has deformed due to being subjected to excessive input of load.

These types of run-flat tire wheels are usually flat as compared to normal tire wheels. Such flat tire wheels have a short distance between the external periphery surface of the wheel and the internal periphery surface of the tire, or, between the external periphery surface of the inner support ring and the internal periphery surface of the tire. As a result, flat tires are more easily influence by excessive input of load from the road surface. For example, FIG. 2 illustrates a state in which the inner support ring tire shown in FIG. 1 has been subjected to excessive up-down input of load from the road surface. As can be understood from FIG. 2, the inner support ring 30 may deform substantially if the tire 20 is subjected to large local input of load when the tire 20 rides up onto a curb or is driven over a large hole in the road surface, or the like. If the inner support ring 30 is deformed substantially in this manner, the inner support ring 30 is not able to properly support the weight of the vehicle when air pressure is lost from the air chamber. Thus, the run-flat running becomes impossible.

However, it is not possible to tell from the outside of the tire 20 that the inner support ring 30 is deformed because it is provided inside of the tire air chamber. Accordingly, if a threshold value intended for a normal tire is used without change, there may be occasions when even though the inner support ring 30 has been damaged by excessive up-down input of load, this damage cannot be detected. Moreover, it is difficult to discern whether the vehicle wheel is damaged from the outside in the case of both normal tire wheels and reinforced side run-flat tire wheels. Thus, in this embodiment, the threshold value for determining vehicle wheel damage is set in accordance with the type of the vehicle wheel fitted to the vehicle. This enables appropriate determination to be made in accordance with the type of vehicle wheel.

Next, the method for calculating the road surface input to the tire will be explained with reference to FIG. 3. Note that, in this specification, the term "road surface input" indicates a force that is equal to the force applied to the tire from the road surface minus the force absorbed by the suspension. In other words, the road surface input is the actual load applied to the tire.

Figure 3:
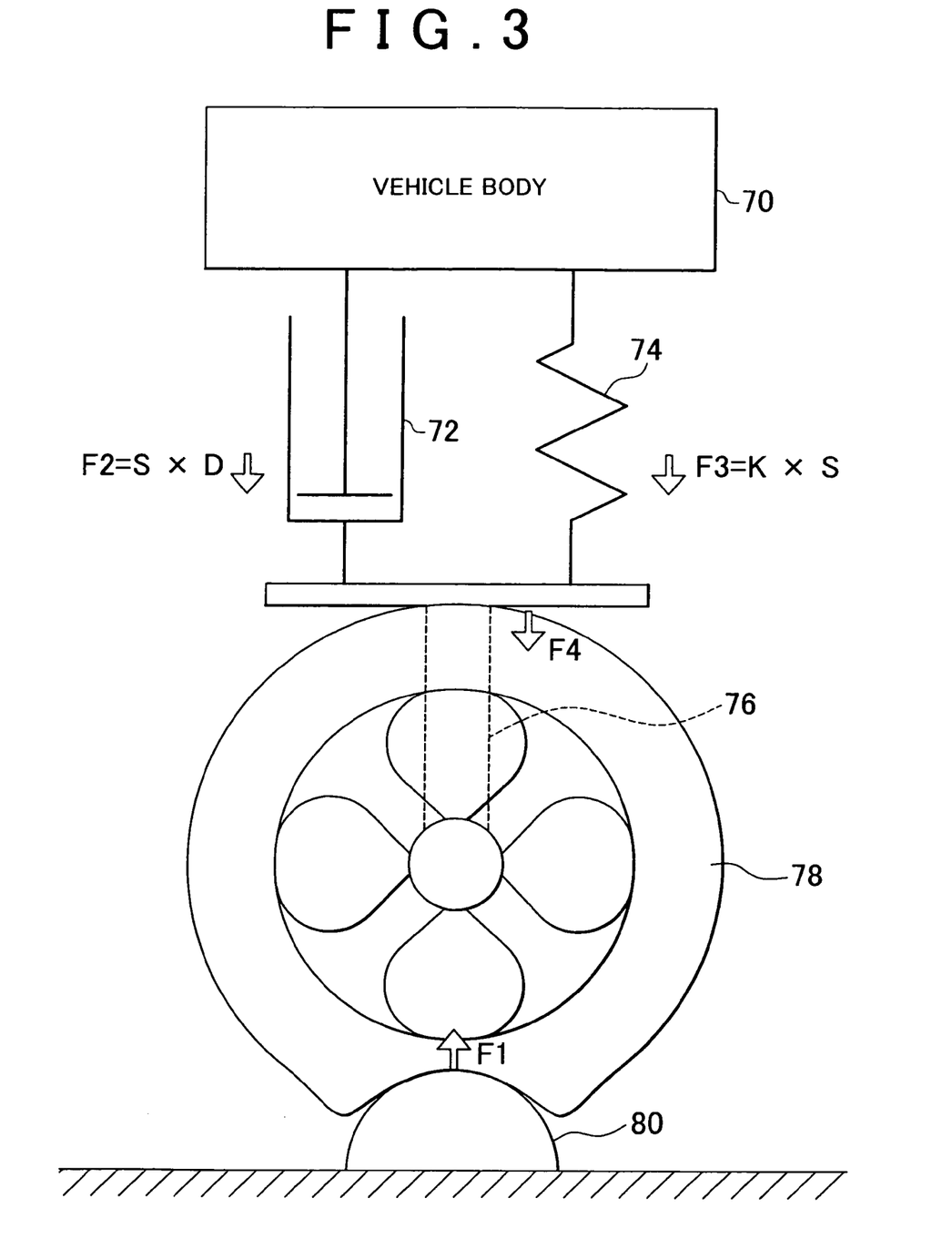
FIG. 3 illustrates a vehicle model for calculating a road surface input.

FIG. 3 illustrates a model of a vehicle body 70 and a vehicle wheel 78 that are linked by a suspension including a damping member 72 and a spring member 74. The vehicle wheel 78 is shown riding over a protrusion 80 in the road surface.

Using a stroke amount value S detected by the stroke sensor, a damping constant D of the damping element 72, a spring constant K of the spring element 74, a force F2 applied to the tire by the damping element 72 and a force F3 applied to the tire by the spring element 74 can be expressed by the following expressions.

$$F2 = D \times S \quad (1)$$

$$F3 = K \times S \quad (2)$$

In an actual vehicle, an arm 76 that supports the vehicle wheel 78 is not positioned on a vertical axis of the vehicle wheel 78. Thus, a load F4 applied from the vehicle body 70 to the vehicle wheel 78 can be expressed by the following expression using an arm ratio α.

$$F4 = \alpha(F2 + F3) \quad (3)$$

Note that, the arm ratio α can be derived for different vehicles using design specifications and based on the structure of each vehicle suspension system including the suspension.

A force F1 in the up-down direction generated by the protrusion 80 is transmitted to the tire of the vehicle wheel 78. This force F1 can be detected, as described previously, by a sensor embedded in the tread of the tire. Accordingly, the road surface input, namely, the force that pushes and compresses the tire that is generated by the protrusion 80 in the road surface, can be expressed as (F1–F4).

Consider an example in which the wheel or the inner support ring of the vehicle wheel 78 has been damaged by road surface input. For damage to occur, it can be assumed that the road surface input is too great to be absorbed by a reaction force generated by deformation of the rubber of the tire alone, and as a result the force generated by the protrusion 80 in the road surface or the curb is directly applied to the wheel or the inner support ring. Accordingly, the road surface input causes a distance H (refer to FIG. 1) between (i) the external periphery surface of the wheel or the external periphery surface of the inner support ring and (ii) the internal periphery surface of the tread of the tire to becomes zero. When this occurs, it can be hypothesized that the wheel or the inner support ring is probably damaged. Accordingly, if a load Fth when the distance H equals zero is set in advance as the threshold value, when (F1–F4) is equal to or greater than the threshold value, it is possible to determine that that the wheel or inner support ring is probably damaged.

More particularly, in the case of an inner support ring run-flat tire wheel, the tire is usually flatter than a normal tire wheel, and the inner support ring protrudes within the tire. As a result, the distance H between the external periphery surface of the inner support ring and the internal periphery surface of the tire tread is smaller than of the corresponding dimensions of a normal tire. Thus, the load Fth at which the distance H becomes zero is likely to be less than that of a normal tire. Accordingly, if the threshold value Fth is set in accordance with the type of the vehicle wheel, determination can be appropriately made in accordance with the type of the vehicle wheel.

Figure 4:
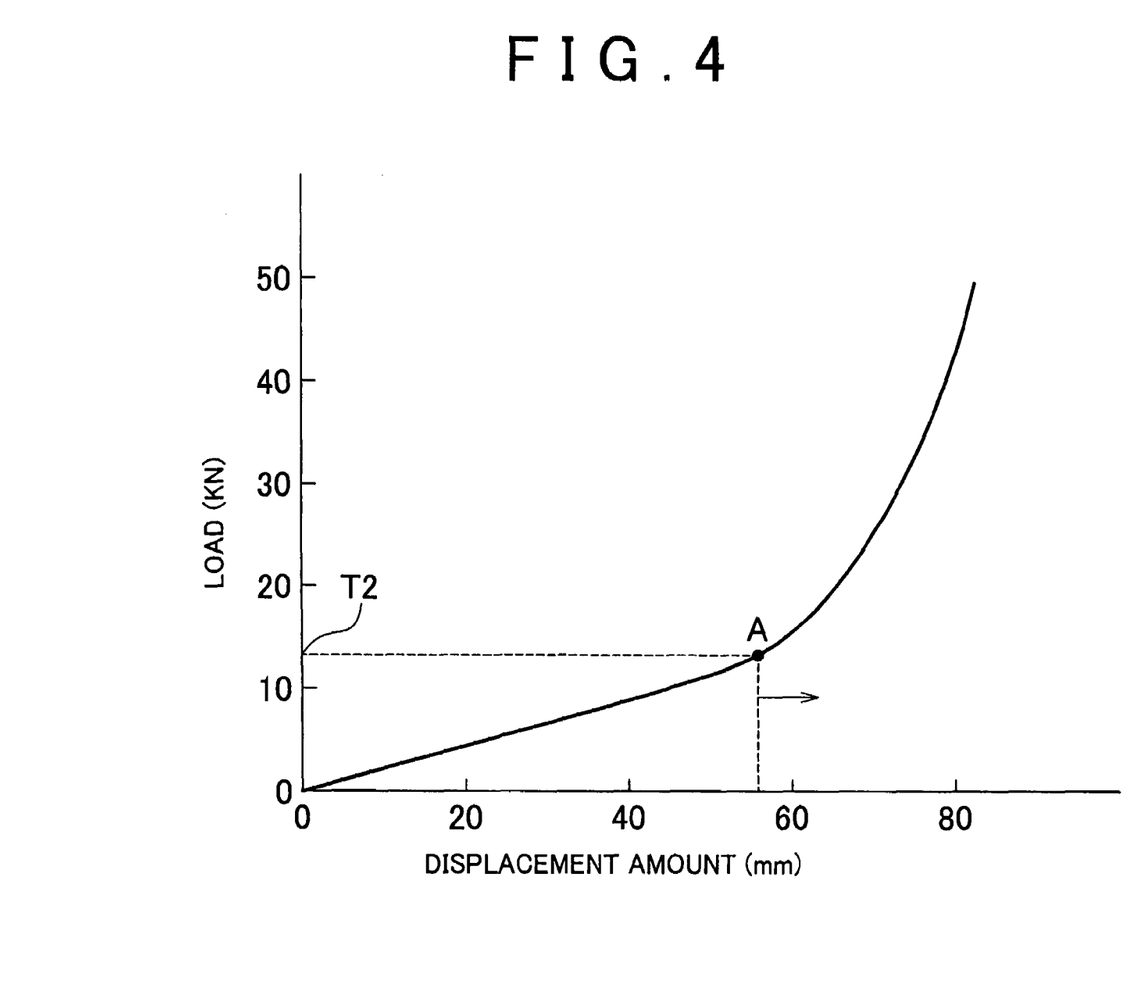
FIG. 4 shows an example of a load-displacement diagram of a tire.

FIG. 4 shows a load-displacement diagram that illustrates the relationship between load applied to the tire and a displacement amount of the tread. For example, if the distance H between the tread of the tire and the external periphery surface of the inner support ring is 57 mm, when the displacement amount is 57 mm, it is appropriate to adopt a load T2 as the threshold value Fth.

Load-displacement diagrams like that shown in FIG. 4 can easily be derived by performing load tests in advance with different combinations of tire and wheel. The information for the load-displacement diagrams can then be pre-recorded as a table in the recording device 32 shown in FIG. 1, and this table can be transmitted to the receiver 50 of the vehicle that is fitted to the vehicle wheel. Alternatively, load-displacement diagram for combinations of different types of tire and wheel can be recorded in advance in the data storage portion 106 of the ECU 100 on the vehicle side. With this configuration, information related to the fitted vehicle wheel, which can be obtained from the recording device 32, is referenced, and the corresponding load-displacement diagram is read.

Figure 5:
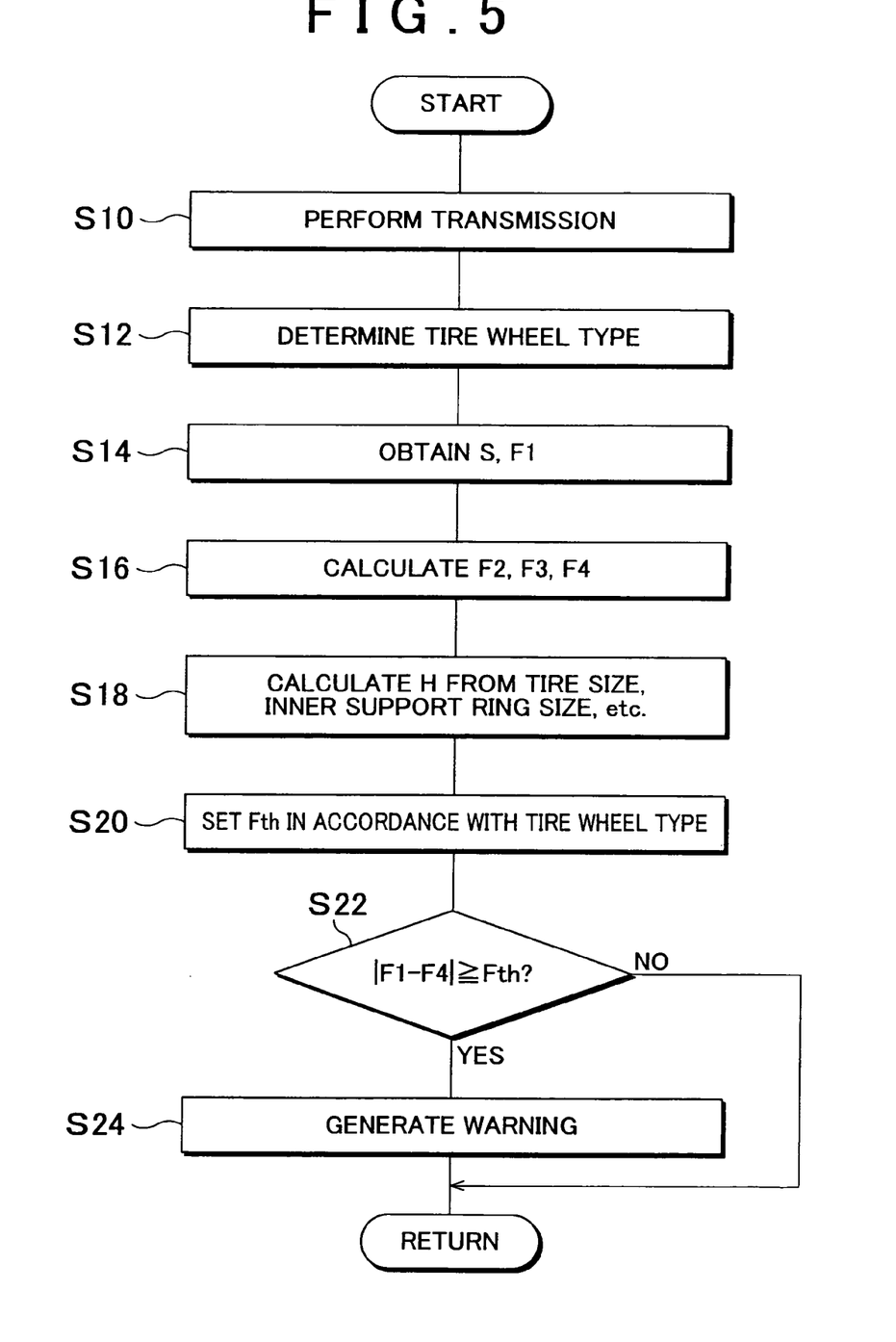
FIG. 5 is a flow chart according to a first embodiment showing a process for determining whether it is probable that a wheel is damaged.

FIG. 5 is a flow chart according to the present embodiment showing a process for determining whether it is probable that a wheel is damaged. First, transmission of information between the vehicle and the vehicle wheel is performed (step S10). This transmission is performed regularly at a predetermined time interval so that the up-down input to the tire can be reliably detected. Note that, once the information related to the vehicle wheel recorded in the recording device 32 has been obtained by the data storage portion 106, it does not need to be transmitted again. For example, the information may be transmitted once when a predetermined period has elapsed following start up of the vehicle, and the obtained information pre-stored in the data storage portion 106. Following this, there is no need to perform transmission during running of the vehicle.

Next, the vehicle wheel distinguishing portion 102 distinguishes the vehicle wheel fitted to the vehicle based on the information transmitted from the recording device 32. More specifically, the vehicle wheel distinguishing portion 102 distinguishes whether the vehicle wheel is a normal tire wheel, a reinforced side run-flat tire wheel or an inner support ring run-flat tire wheel (step S12).

The road surface input calculation portion 108 calculates the up-down input F1 based on the detection value of the sensor 34, and the load estimation portion 112 obtains the stroke amount value S from the stroke sensor 40 (step S14). Then, the road surface input calculation portion 108 calculates the forces F2, F3 and F4 based on expressions (1) to (3) described above (step S16).

The threshold value setting portion 104 calculates a maximum deflection amount H for the tire using the tire size, wheel size and inner support ring size obtained from the recording device 32 (step S18). For example, if the fitted vehicle wheel is a normal tire wheel or a reinforced side run-flat tire wheel, the maximum deflection amount H can be calculated from an internal diameter of the tire, and an external diameter of the wheel. In the case of an inner support ring run-flat tire wheel, the maximum deflection amount H can be calculated from the internal diameter of the tire and the external diameter of the inner support ring within the tire.

Next, the threshold value setting portion 104 sets the threshold value Fth in accordance with the type of the vehicle wheel (step S20). More particularly, the table of the load-displacement diagram is referenced, and the load Fth corresponding to the calculated maximum displacement amount H is obtained. As described above, the table may be pre-recorded in the recording device 32, or may be pre-stored in the data storage portion 106 for different conceivable combinations of tire and wheel. Moreover, as a simple method, the same table for the load-displacement diagram may be used for all types of vehicle wheel.

The damage determination portion 110 determines whether the condition, |F1–F4|≧Fth, is satisfied, based on the values calculated in steps S14 and S16 (step S22). In the case that this condition is satisfied (YES in step S22), it is determined that the wheel 22 or the inner support ring 30 is probably damaged. Accordingly, the warning device 60 generates an alarm (step S24). If the condition is not satisfied (NO in step S22), the routine is terminated.

As has been explained, according to the first embodiment, information related to tire size pre-recorded in the recording device 32 attached to the tire is obtained, and the threshold value for determining whether damage has probably occurred is set in accordance with the type of the vehicle wheel. Thus, it is possible to accurately perform damage determination for the wheel or the inner support ring in accordance with the type of the vehicle wheel fitted to the vehicle.

Second Embodiment

In the first embodiment, the threshold value for determining whether damage has probably occurred is set in accordance with the type of vehicle wheel as described above. However, when the fitted vehicle wheel is an inner support ring run-flat tire wheel, there is a possibility that either (i)

damage of the inner support ring or (ii) damage of the wheel may have occurred. Accordingly, separate determinations for damage of both of these portions may be performed. The structural configuration of a vehicle wheel state monitoring device according to a second embodiment is the same as that of the first embodiment shown in FIG. 1, and thus a drawing to illustrate the second embodiment is omitted here.

Figure 6:
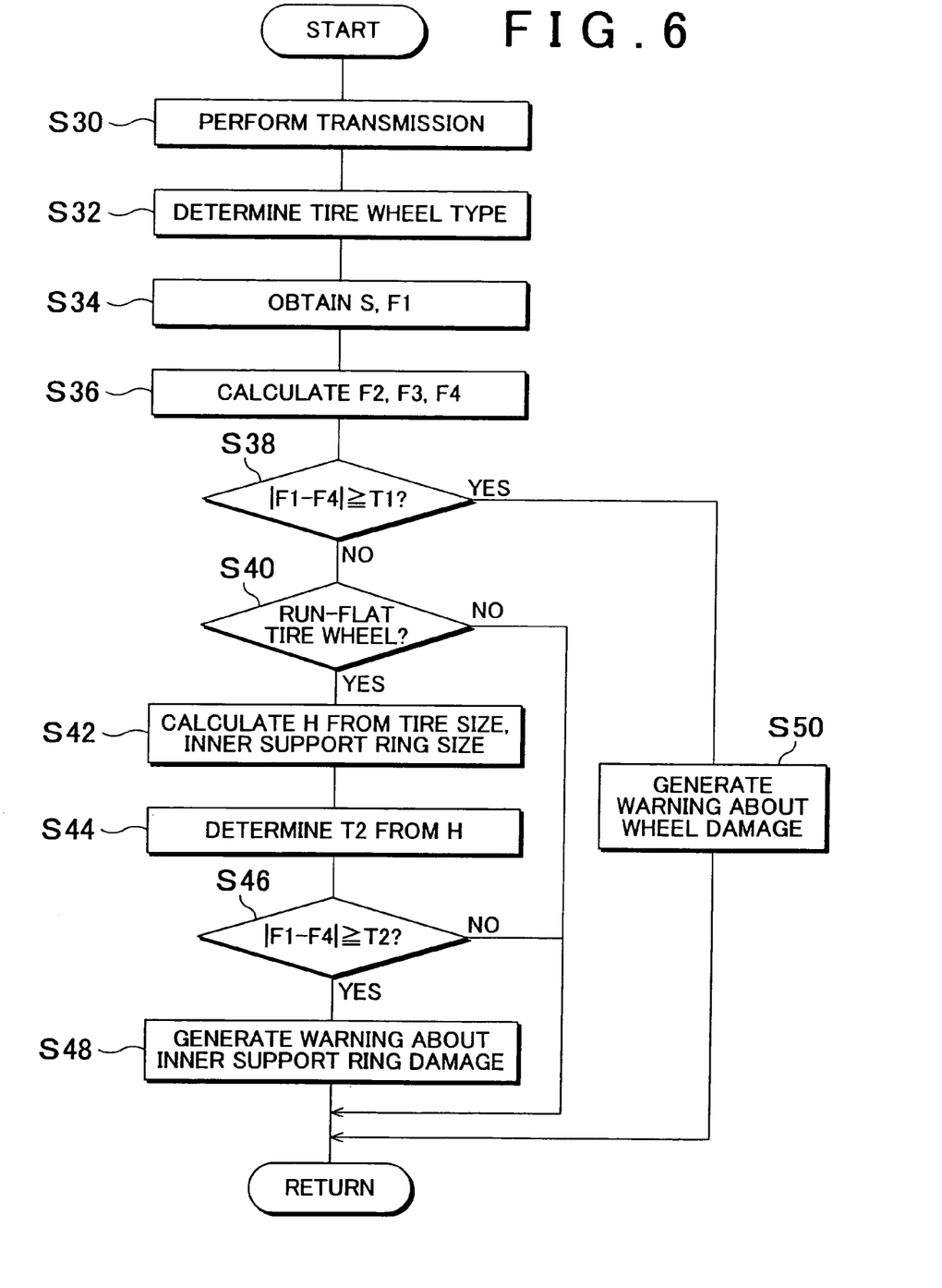
FIG. 6 is a flow chart according to a second embodiment showing a process for determining whether it is probable that a wheel is damaged.

FIG. 6 is a flow chart according to the second embodiment showing a process for determining whether it is probable that a wheel is damaged. Steps S30 to S36 are the same as steps S10 to S16 of FIG. 5, and thus an explanation thereof is omitted here. The damage determination portion 110 first determines whether the up-down input to the vehicle wheel is excessive enough to make damage of the wheel probable, namely, whether there is excessive up-down input. The values calculated in steps S34 and S36 are used as a basis for determining whether the condition, $|F1-F4| \geq T1$, is satisfied (step S38). Here, T1 is a predetermined threshold value for determining whether the up-down input is excessive enough to make damage of the wheel probable. This threshold value may be derived in advance using impact experiments or the like. In the case that the condition of step S38 is satisfied (YES in step S38), it is determined that the wheel is probably damaged, and the warning device 60 is caused to generate a warning (step S50). The routine is then terminated.

If the condition of step S38 is not satisfied (NO in step S38), even if the wheel has not been damaged, there is a likelihood that the inner support ring has been damaged enough to have an impact on run-flat running. Accordingly, the damage determination portion 110 proceeds to determine whether the inner support ring has been damage. The threshold value setting portion 104 determines whether the fitted vehicle wheel is a run-flat tire wheel (step S40). If the vehicle wheel is not a run-flat tire wheel (NO in step S40), the routine is terminated. If the vehicle wheel is a run-flat tire wheel (YES in step S40), however, the threshold value setting portion 104 calculates the maximum deformation amount H based on the information about tire size and inner support ring size recorded in the recording device 32 (step S42). Next, the table of data for the load-displacement diagram in the data storage portion 106 is referenced, and a load threshold value T2 that corresponds to the maximum deformation amount H is determined (step S44). The damage determination portion 110 uses the threshold value T2 to determine whether the condition, $|F1-F4| \geq T2$, is satisfied (step S46). If the condition of step S46 is not satisfied (NO in step S46), the routine is terminated. If the condition of step S46 is satisfied (YES in step S46), it is determined that the inner support ring is probably damaged, and thus the warning device 60 is caused to generate a warning (step S48).

As described above, according to the second embodiment it is possible to determine whether the wheel is probably damaged, and, in addition, set a threshold value for determining, in the case of a run-flat tire wheel, whether the inner support ring is probably damaged. Accordingly, it is possible to perform determination while specifying the portion that is probably damaged.

The second embodiment may also be applied to a reinforced side run-flat tire wheel. The structure of a reinforced side run-flat tire wheel and an inner support ring run-flat tire wheel differ substantially, and thus the threshold values used in each case may be different. More specifically, tables for load-displacement diagrams that correspond respectively to the reinforced side and the inner support ring run-flat tire wheels may be pre-prepared.

Hereinabove, various embodiments of the invention have been described. These embodiments are, however, merely examples, and the invention permits of various modifications of the described combinations of structural elements and processes. As will be understood by those skilled in the art, such modifications fall within the scope of the invention.

In the embodiments, separate recording devices 32 are attached to all of the vehicle wheels fitted to the vehicle. However, the recording device 32 may be provided on just inner support ring run-flat tire wheels. In this case, first, the vehicle wheel distinguishing portion 102 determines whether the recording device 32 is provided on the vehicle wheel. Then, if no recording device 32 is attached to the vehicle wheel, it is determined that the vehicle wheel has a normal tire. Accordingly, a table for a standard load-displacement diagram that is pre-stored in the data storage portion 106 is adopted, and the calculation of the following processes (calculation corresponding to steps S18 to S22, and S42 to S46) is performed. On the other hand, if the recording device 32 is attached to the vehicle wheel, it is determined that the vehicle wheel has an inner support ring run-flat tire wheel, and a table for an inner support ring load-displacement diagram recorded in the recording device 32 is adopted, and the calculation of the following processes (calculation corresponding to steps S18 to S22, S42 to S46) is performed. As a result of adopting this configuration it is no longer necessary to attach the recording device 32 to all of the vehicle wheels, whereby cost can be reduced.

In the above embodiments, information is transmitted between the vehicle wheel and the vehicle during running of the vehicle thus allowing the threshold value for determining whether the vehicle wheel is damaged to be set. However, the threshold value may be only set when, for example, an ignition switch of the vehicle is turned on, or when initialization of the settings is necessary following replacement of the vehicle wheels.

What is claimed is:

1. A vehicle wheel state monitoring device comprising:
a detector which is provided on a vehicle wheel and which detects an up-down direction force transmitted from a road surface to a tire of the vehicle wheel;
a calculation unit that calculates a road surface input that is a load applied to the tire using the detected up-down direction force;
a recording device which is provided on the vehicle wheel and which pre-records information related to the vehicle wheel;
a vehicle wheel distinguishing unit that distinguishes a type of the vehicle wheel based on the information which is received from the recording device;
a setting unit that sets a first threshold value in accordance with the distinguished type of the vehicle wheel; and
a determination unit that determines whether it is probable that the vehicle wheel is damaged by comparing the road surface input and the set first threshold value.

2. The vehicle wheel state monitoring device according to claim 1, wherein
the recording device stores information related to a plurality of different types of the vehicle wheel;
the vehicle wheel distinguishing unit distinguishes between a plurality of different types of the vehicle wheel; and
the setting unit sets, as the first threshold value, one of a plurality of threshold values that are respectively used for corresponding vehicle wheels among the plurality of different types of the vehicle wheel.

3. The vehicle wheel state monitoring device according to claim 1, wherein
when the vehicle wheel distinguishing unit distinguishes that the vehicle wheel is a run-flat tire wheel, the setting unit sets the first threshold value to a value that is less than a threshold value for a normal tire wheel.

4. The vehicle wheel state monitoring device according to claim 2, wherein
the determination unit determines whether it is probable that the vehicle wheel is damaged by comparing the road surface input and a second threshold value that is larger than the set first threshold value.

5. The vehicle wheel state monitoring device according to claim 4, wherein
the determination unit determines what portion of the vehicle wheel is damaged by comparing the road surface input and the second threshold value.

6. The vehicle wheel state monitoring device according to claim 1, wherein
when the vehicle wheel distinguishing unit distinguishes that the vehicle wheel is an inner support ring run-flat tire wheel, the setting unit sets, as the first threshold value, the road surface input when a distance between an internal periphery surface of the tire and an external periphery surface of the inner support ring becomes smaller than a predetermined distance, the distance being recorded in the recording device.

7. The vehicle wheel state monitoring device according to claim 1, further comprising:
a load estimation unit that estimates a load applied to the vehicle wheel from the vehicle based on reference to design information about a suspension system of the vehicle that is recorded in advance; wherein
the calculation unit calculates the road surface input based on a difference between the estimated load and the detected up-down direction force.

8. A vehicle wheel state monitoring method comprising:
detecting an up-down direction force transmitted from a road surface to a tire of a vehicle wheel;
calculating a road surface input that is a load applied to the tire using the detected up-down direction force;
receiving information from a recording device that pre-records information related to the vehicle wheel, the recording device being provided on the vehicle wheel;
distinguishing a type of the vehicle wheel based on the received information;
setting a threshold value in accordance with the distinguished type of the vehicle wheel;
determining whether it is probable that the vehicle wheel is damaged by comparing the road surface input and the set threshold value; and
outputting a signal to a warning device when it is determined that vehicle wheel damage is probable.

9. A computer-readable storage medium that stores a program for monitoring a vehicle wheel state, the program comprising instructions that cause a computer to perform the steps of:
detecting an up-down direction force transmitted from a road surface to a tire of a vehicle wheel;
calculating a road surface input that is a load applied to the tire using the detected up-down direction force;
receiving information from a recording device that pre-records information related to the vehicle wheel, the recording device being provided on the vehicle wheel;
distinguishing a type of the vehicle wheel based on the received information;
setting a threshold value in accordance with the distinguished type of the vehicle wheel;
determining whether it is probable that the vehicle wheel is damaged by comparing the road surface input and the set threshold value; and
outputting a signal to a warning device when it is determined that vehicle wheel damage is probable.

* * * * *